United States Patent
Kaneko

[11] Patent Number: 5,930,048
[45] Date of Patent: Jul. 27, 1999

[54] COLOR SEPARATION OPTICAL SYSTEM

[75] Inventor: Koji Kaneko, Omiya, Japan

[73] Assignee: Fuji Photo Optical Co., Ltd., Omiya, Japan

[21] Appl. No.: 09/003,029

[22] Filed: Jan. 5, 1998

[30] Foreign Application Priority Data

Jan. 6, 1997 [JP] Japan .................. 9-000232

[51] Int. Cl.⁶ .................................................. G02B 27/14
[52] U.S. Cl. ......................................................... 359/634
[58] Field of Search .......................... 359/634; 250/226; 358/505, 512, 514, 515

[56] References Cited

U.S. PATENT DOCUMENTS 5,541,771  7/1996  Bohn .................................... 359/634

Primary Examiner—Georgia Epps
Assistant Examiner—Ricky Mack
Attorney, Agent, or Firm—Sixbey, Friedman, Leedom & Ferguson; David S. Safran

[57] ABSTRACT

Each reflective wall of two pairs of parallel reflective walls, which compose a four-wall reflection optical system, consists of three layers of a first dichroic mirror which reflects blue light, a second dichroic mirror which reflects green light, and a third dichroic mirror which reflects red light. In the four-wall reflection optical system, the total number of reflections varies according to the ratio of lengths of two pairs of the parallel reflective walls. For this reason, by selecting the number of reflections, it is possible to form an optical path of desired length and to color-separate the incident light into three rays of the three primary colors at desired separation intervals. A color scanner optical system can easily be constructed by using the color separation optical system and a 3-line CCD.

3 Claims, 8 Drawing Sheets

COLOR SEPARATION OPTICAL SYSTEM

BACKGROUND OF THE INVENTION

1. Field of the Invention

The present invention relates generally to a color separation optical system, and more particularly to a color separation optical system which is suitable for a compact color scanner which uses a 3-line CCD.

2. Description of Related Art

A hand-scanner captures image information of a subject (e.g. a piece of paper, a picture, etc.), while moving along the subject, by illuminating the subject with an illumination light source and guiding light which is reflected by the subject and which enters the hand-scanner through a read opening (a slit) to a line sensor consisting of charge coupled devices (CCD) via a lens. In order to secure a conjugate distance of the lens, a plurality of mirrors for turning and lengthening an optical path are arranged in a casing of the conventional scanner.

In a color hand-scanner, which captures color image of a color subject, two dichroic mirrors are provided to separate incident light into rays of the three primary colors, red (R), green (G) and blue (B), and the CCD of each color channel receives the rays of each color. A first dichroic mirror which reflects blue light separates the blue light from the incident light, and the light which is transmitted through the first dichroic mirror meets a second dichroic mirror which reflects green light. The second dichroic mirror separates the green light from the falling light, and red light is transmitted through the second dichroic mirror. Thus, the incident light is separated into the blue light, the green light and the red light.

In the above-mentioned conventional scanner optical system, however, it is necessary to finely adjust arrangement angles of the mirrors which are arranged to secure the conjugate distance, and it is extremely difficult to arrange the plurality of mirrors at proper arrangement angles. If the number of turns of the optical path increases, the number of mirrors must also be increased, so that the scanner optical system cannot be compact.

In particular, in the case of the color scanner which uses a 3-line CCD, rays of the three colors must be separated from one another at proper intervals in accordance with arrangement of light receiving channels of the colors in the CCD.

SUMMARY OF THE INVENTION

The present invention has been developed in view of the above-described circumstances, and has as its object the provision of a color separation optical system with a simple structure which is able to form an optical path of desired length, to separate incident light into rays of the three primary colors, and to arrange the rays at desired intervals.

To achieve the above-mentioned object, a color separation optical system of the present invention comprises: two pairs of parallel reflective walls, each reflective wall of at least one pair of the two pairs of parallel reflective walls consisting of a first dichroic mirror reflecting light of a first color among the three primary colors, a second dichroic mirror reflecting light of a second color among the three primary colors, and a mirror reflecting light of a third color among the three primary colors, the first and second dichroic mirrors and the mirror reflecting light of the third color being stacked in order from a light incident face of the reflective wall; and the color separation optical system is characterized in that light which enters an area enclosed by the two pairs of parallel reflective walls through an entrance opening is reflected at least once on every reflective wall of the two pairs of parallel reflective walls, the light is color-separated into three rays of the three primary colors, and the three rays are output through an exit opening.

That is, in the four-wall reflection optical system composed of two pairs of parallel reflective walls, the light enters the area enclosed by the two pairs of parallel reflective walls through the entrance opening, and then the light is reflected at least once on every reflective wall and exits the optical system through the exit opening. The route of the light is turned on the four reflective walls to thereby form a relatively long optical path, so that the optical system can be compact.

Each reflective wall of at least one pair of parallel reflective walls in the four-wall reflection optical system consists of three layers of the first dichroic mirror which reflects light of the first color among the three primary colors, the second dichroic mirror which reflects light of the second color among the three primary colors, and a mirror which reflects light of the third color among the three primary colors. Every reflective wall in the four-wall reflection optical system may consist of the three layers, or each reflective wall of a pair of reflective walls may be an ordinary mirror.

If white light falls on the reflective wall composed of the three layers, the white light meets the first dichroic mirror, and light of the first color among the three primary colors is reflected by the first dichroic mirror. Then, the light which is transmitted through the first dichroic mirror meets the second dichroic mirror, and light of the second color among the three primary colors is reflected by the second dichroic mirror. Thereby, the light which is transmitted through the second dichroic mirror is the third color among the three primary colors. The third color light is reflected by the mirror under the second dichroic mirror. Thus, the white light is separated into three rays of the three primary colors, and the three rays are reflected in parallel at separation intervals in accordance with the thickness of the first and second dichroic mirrors. Thereafter, each color ray is reflected by the four reflective walls, and the color rays are output from the optical system in parallel through the exit opening.

In the four-wall reflection optical system, the total number of reflections varies according to the ratio of lengths of two pairs of the parallel reflective walls. For this reason, by selecting the number of reflections, an optical path of desired length can be formed, and the light can be color-separated into three color rays at desired separation intervals.

According to an embodiment of the present invention, each reflective wall of one pair of two pairs of parallel reflective walls consists of three layers of the first and second dichroic mirrors and the mirror reflecting the third color light which are stacked in order from the light incident face of the reflective wall. To the contrary, each reflective wall of the other pair of parallel reflective walls consists of three layers of a third dichroic mirror which reflects the third color light, the second dichroic mirror, and a mirror which reflects the first color light which are stacked in order from the light incident face of the reflective wall. Thereby, the color separation intervals can be longer compared with the case where the four reflective walls are constructed in the same manner.

Furthermore, a color scanner optical system of the present invention for color-separating light, reflected by a subject illuminated by a light source, into three rays of the three primary colors, and for guiding each of the three rays to a light accepting plane in each color channel of a 3-line sensor via a lens, the color scanner optical system comprises: two pairs of parallel reflective walls, each reflective wall of at least one pair of the two pairs of parallel reflective walls consisting of a first dichroic mirror reflecting light of a first color among the three primary colors, a second dichroic mirror reflecting light of a second color among the three primary colors, and a mirror reflecting light of a third color among the three primary colors, the first and second dichroic mirrors and the mirror reflecting light of the third color being stacked in order from a light incident face of the reflective wall; and the color scanner optical system is characterized in that the light reflected by the subject which enters an area enclosed by the two pairs of parallel reflective walls is reflected at least once on every reflective wall of the two pairs of parallel reflective walls, the light is color-separated into three rays of the three primary colors, the rays being parallel with one another, and the three rays are guided to the lens.

That is, the present invention is characterized in that the above-described color separation optical system is applied to the color scanner optical system. The color separation optical system is able to form an optical path of desired length in accordance with the selected number of reflections, and is able to color-separate the light into three color rays at desired separation intervals. Thus, the separation interval can easily correspond to the light accepting plane of color channels of the 3-line sensor.

If the four reflective walls in the four-wall reflection optical system are ordinary mirrors and a one-line sensor is used as an image pickup means, the scanner optical system of a single color (black and white) can be constructed. In this viewpoint, the above-mentioned dichroic mirrors are used for at least one pair of reflective walls in the four-wall reflection optical system, and the 3-line sensor is used as the image pickup means. Thereby, the color scanner optical system can easily be constructed, and the black and white scanner optical system can easily be converted to the color scanner optical system.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
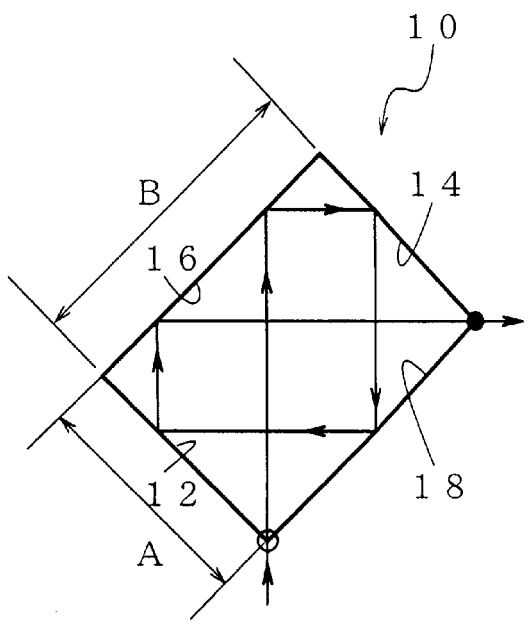
FIG. 1 is a view describing a reflection route in a four-wall reflection optical system which has two pairs of parallel reflective walls which are different in length.

This invention will be described in further detail by way of example with reference to the accompanying drawings.

First, an explanation will be given of a four-wall reflection optical system which is composed of two pairs of parallel reflective walls and is used in a color separation optical system according to the present invention.

FIGS. 1–4 describe a section of the four-wall reflection optical system 10 which is composed of two pairs of parallel reflective walls. The four-wall reflection optical system 10 has a pair of parallel reflective walls 12, 14 of the length A, and a pair of parallel reflective walls 16, 18 of the length B (>A), and the two pairs of parallel reflective walls which are different in length are perpendicular to one another. A description will be given of a reflection route of light which enters the four-wall reflection optical system through a bottom apex (an incident point) indicated with a white circle in the drawings, with respect to a ratio of the length A to the length B.

FIG. 1 shows the state of A:B=3:4. The light enters the four-wall reflection optical system 10 upward in the drawing through the incident point indicated with the white circle in the drawing, and then the light is reflected by the reflective wall 16 (hereinafter referred to as a first reflective wall) to the right at a right angle. Thereafter, the light is sequentially reflected by the reflective wall 14 (a second reflective wall), the reflective wall 18 (a third reflective wall) and the reflective wall 12 (a fourth reflective wall). Finally, the light is reflected by the first reflective wall 16, and the light exits the four-wall reflection optical system 10 through an apex (an output point) at the right end indicated with a black circle in the drawing. In this case, the total number of reflections is five, and an optical path length is $4\sqrt{2}A$.

Figure 2:
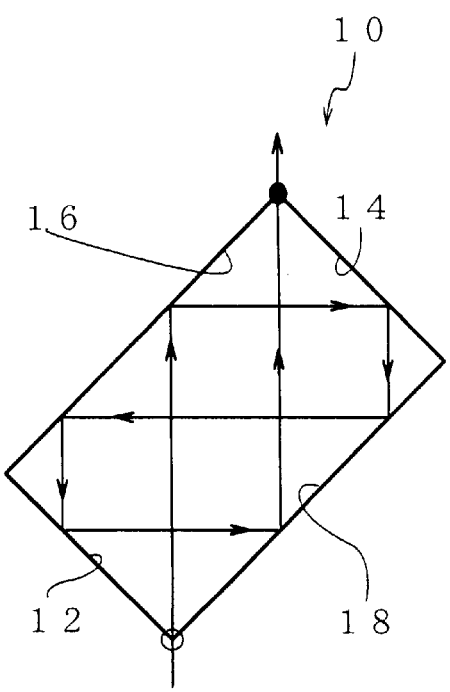
FIG. 2 is a view describing a reflection route in a four-wall reflection optical system which has two pairs of parallel reflective walls which are different in length.

FIG. 2 shows the state of A:B=3:5. The light enters the four-wall reflection optical system 10 upward in the drawing through the incident point indicated with the white circle in the drawing, and then the light is reflected by the first reflective wall 16 to the right at a right angle.

Thereafter, the light is sequentially reflected by the second reflective wall 14, the third reflective wall 18, the first reflective wall 16, the fourth reflective wall 12, and the third reflective wall 18. Then, the light exits the four-wall reflection optical system 10 through a top apex (an output point) indicated with a black circle in the drawing. In this case, the total number of reflections is six, and an optical path length is $5\sqrt{2}A$.

Figure 3:
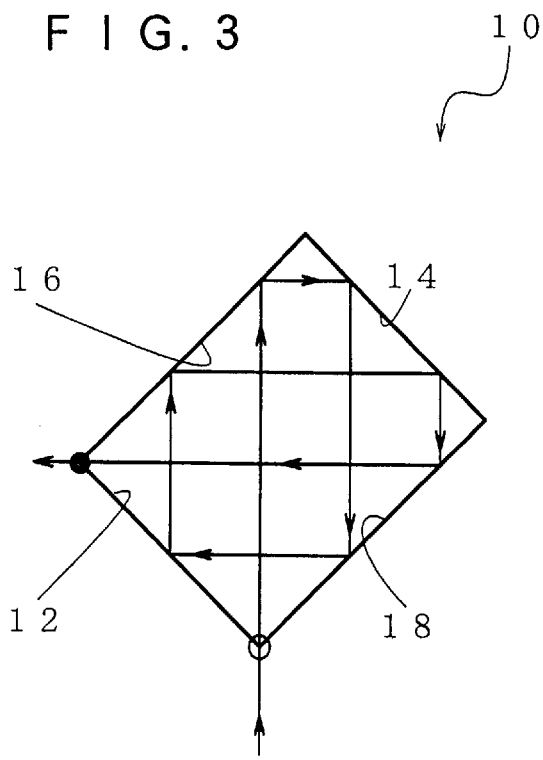
FIG. 3 is a view describing a reflection route in a four-wall reflection optical system which has two pairs of parallel reflective walls which are different in length.

FIG. 3 shows the state of A:B=4:5. The light enters the four-wall reflection optical system 10 upward in the drawing through the incident point indicated with the white circle in the drawing, and then the light is reflected by the first reflective wall 16 to the right at a right angle. Thereafter, the light is sequentially reflected by the second reflective wall 14, the third reflective wall 18, the fourth reflective wall 12, the first reflective wall 16, the second reflective wall 14, and the third reflective wall 18. Then, the light exits the four-wall reflection optical system 10 through an apex (an output point) at the left end indicated with a black circle in the drawing. In this case, the total number of reflections is seven, and an optical path length is $5\sqrt{2}A$.

Figure 4:
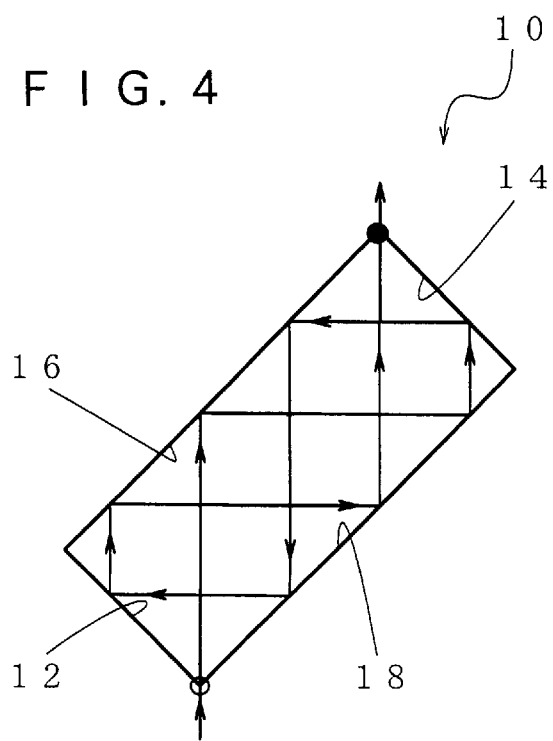
FIG. 4 is a view describing a reflection route in a four-wall reflection optical system which has two pairs of parallel reflective walls which are different in length.

FIG. 4 shows the state of A:B=3:7. The light enters the four-wall reflection optical system 10 upward in the drawing through the incident point indicated with the white circle in the drawing, and then the light is reflected at least once on each reflective wall. After the light is reflected eight times, the light exits the four-wall reflection optical system 10 through the top apex (an output point) indicated with a black circle in the drawing. In this case, an optical path length is $7\sqrt{2}A$.

As shown in FIGS. 1–4, in the four-wall reflection optical system, the reflection route and the number of reflections vary according to the ratio between lengths of the two pairs of parallel walls (A:B), and the output direction and the optical path length can be appropriately changed.

In the present invention, dichroic mirrors are used in the reflective walls of the above-described four-wall reflection optical system, and thus the color separation optical system is constructed.

Figure 5:
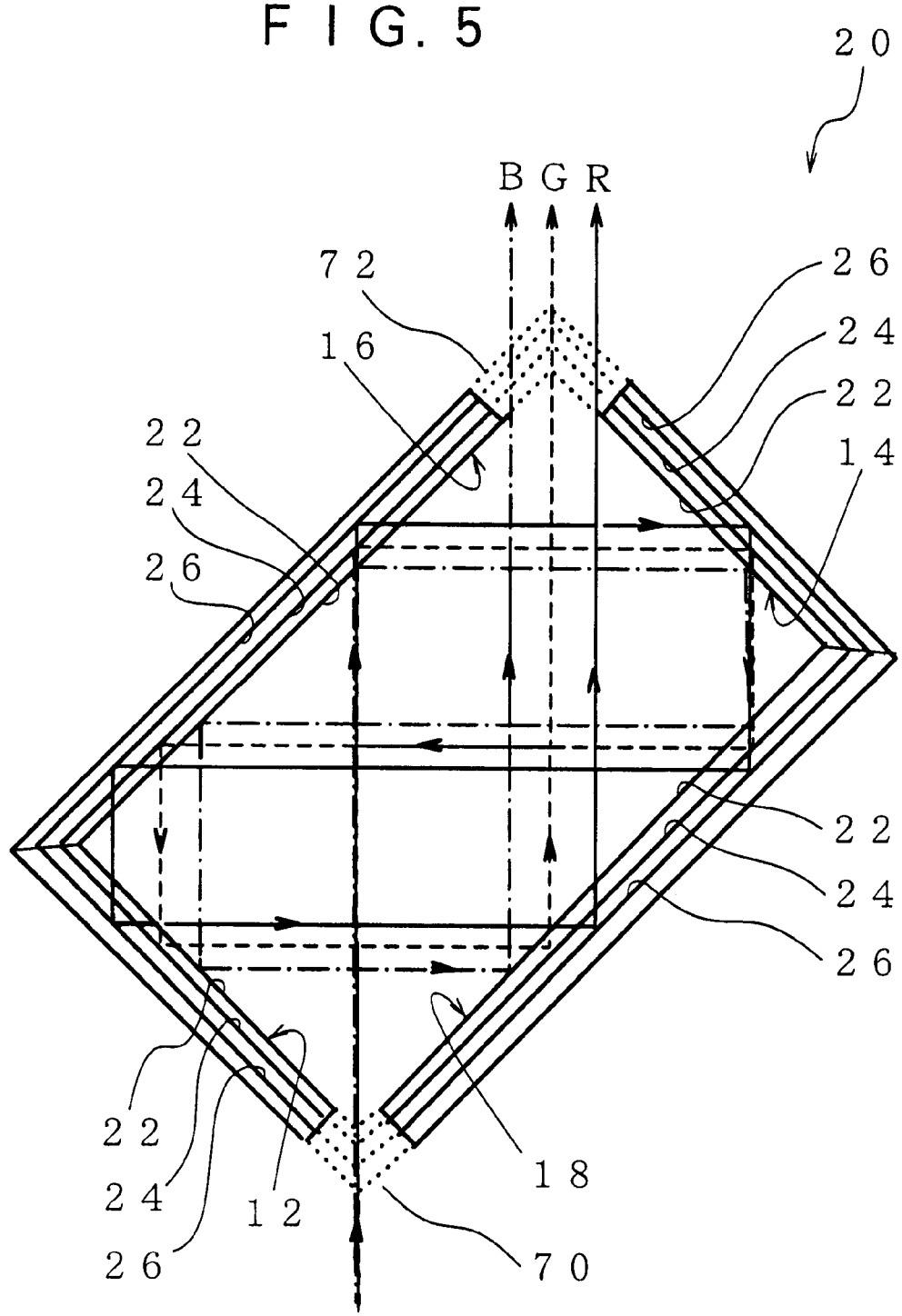
FIG. 5 is a view illustrating the construction of an embodiment for the color separation optical system of the present invention.

FIG. 5 is a schematic view of the section of an embodiment for the color separation optical system according to the present invention. In the color separation optical system 20 shown in FIG. 5, each of the reflective walls 12, 14, 16, 18, which compose the four-wall reflection optical system, consists of a first dichroic mirror 22 which reflects blue light, a second dichroic mirror 24 which reflects green light, and a third dichroic mirror 26 which reflects red light. These three dichroic mirrors 22, 24, 26 are stacked in order from a light incident face of the reflective wall. An ordinary mirror, which reflects light of any color, may be used instead of the third dichroic mirror 26.

For example, the reflective wall is formed as follows: a surface of a plane substrate of glass is coated with an ordinary reflective film which reflects light of any color; then, the ordinary reflective film on the substrate is coated with a dichroic reflective film which reflects green light (the second dichroic mirror); thereafter, the dichroic reflective film which reflects green light is coated with a dichroic reflective film which reflects blue light (the first dichroic mirror).

If white light enters the four-wall reflection type color separation optical system 20 shown in FIG. 5 through an entrance opening 70, which is formed in proximity to a bottom apex in the drawing, and falls on the first reflective wall 16 at an incident angle of 45°, only a blue ray is reflected by the first dichroic mirror 22 to the right at a right angle. The blue ray is indicated with a dash and dotted line in FIG. 5.

The light which is transmitted through the first dichroic mirror 22 of the first reflective wall 16 meets the second dichroic mirror 24. Then, only a green ray is reflected by the second dichroic mirror 24 to the right at a right angle. The green ray is indicated with a dashed line in FIG. 5.

The red ray is transmitted through the second dichroic mirror 24 and meets the third dichroic mirror 26. Then, the red ray is reflected by the third dichroic mirror 26 to the right at a right angle. The red ray is indicated with a solid line in FIG. 5.

Next, the blue, green and red rays fall on the second reflective wall 14 at an incident angle of 45°. Then, the blue, green and red rays are reflected by the first dichroic mirror 22, the second dichroic mirror 24, the third dichroic mirror 26, respectively, of the second reflective wall 14, and fall on the third reflective wall 18. Hereafter, the blue, green and red rays are sequentially reflected by the third reflective wall 18, the first reflective wall 16, the fourth reflective wall 12 and the third reflective wall 18 in the above-described manner.

The light which is turned upward by the last reflective wall (the third reflective wall 18) is color-separated into the blue, green and red rays in order from the left side in the drawing, and the color rays finally exit the color separation optical system 20 through an exit opening 72, which is formed in proximity to a top apex in the drawing.

The separation intervals between the color rays which are output from the color separation optical system 20 are dependent on the thickness of the first and second dichroic mirrors 22, 24 and the number of reflections.

Next, a description will be given of the case where the color separation optical system in FIG. 5 is applied to a color scanner optical system.

Figure 6:
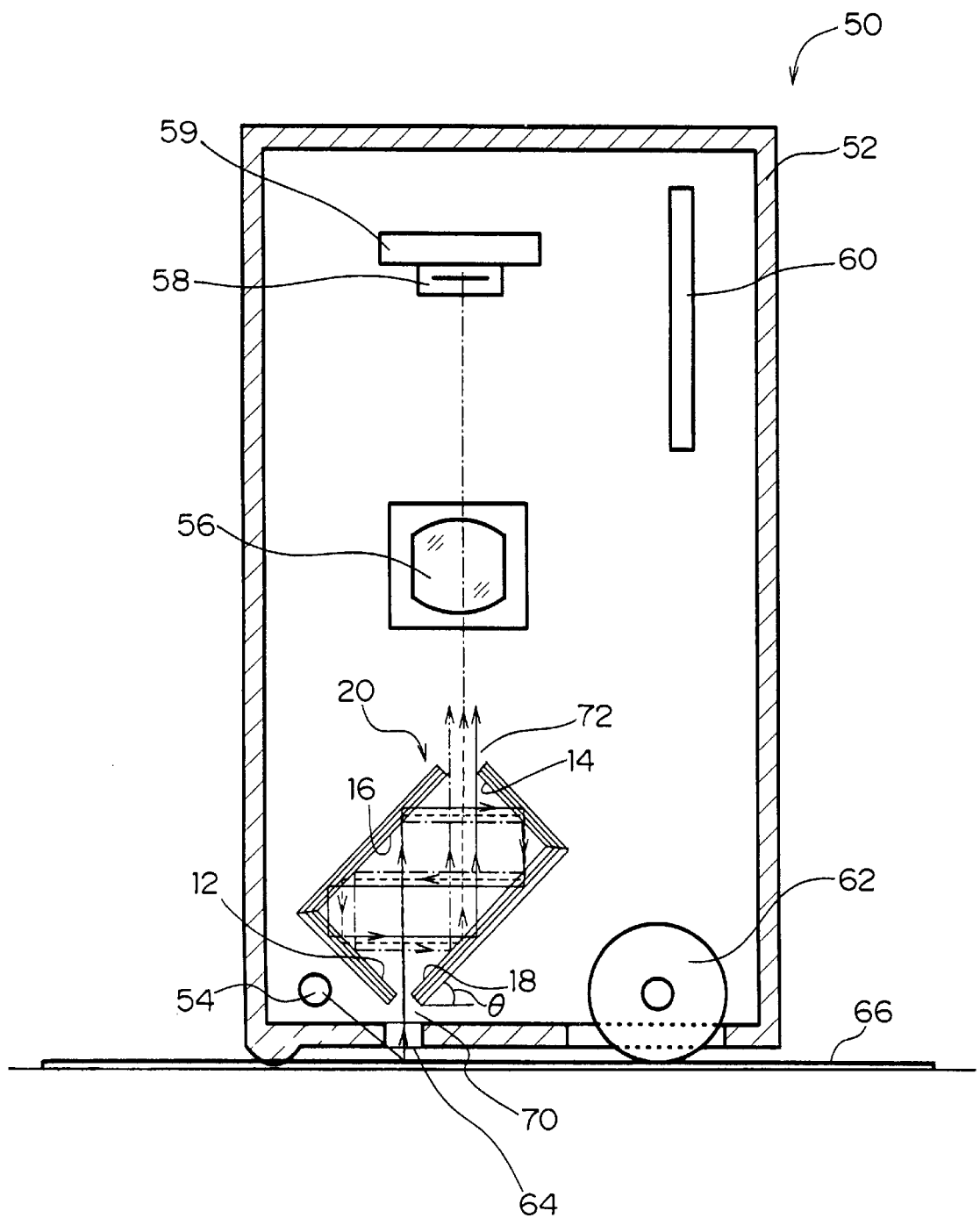
FIG. 6 is a side sectional view of a color scanner to which the embodiment for the color separation optical system of the present invention is applied.
Figure 7:
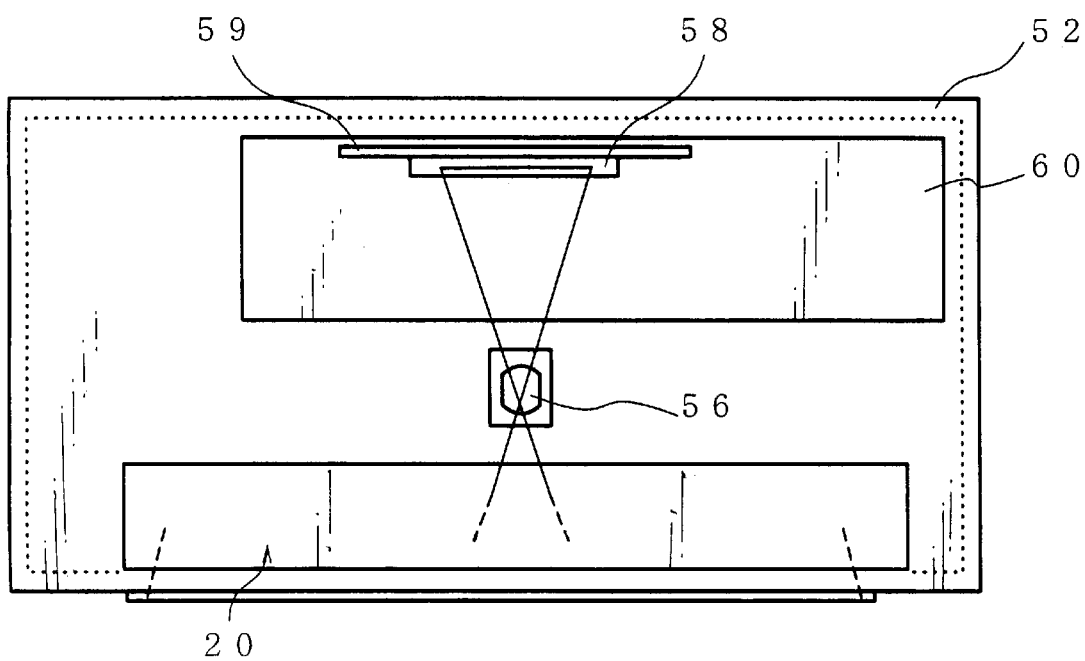
FIG. 7 is a front perspective diagram of the color scanner to which the embodiment for the color separation optical system of the present invention is applied.

FIG. 6 is a sectional view of a color scanner to which the embodiment for the color separation optical system of the present invention is applied. FIG. 7 is a front perspective diagram of the color scanner.

The scanner 50 in FIGS. 6 and 7 is constructed in such a way that an illumination light source 54, the color separation optical system 20, a lens 56, a 3-line sensor (CCD) 58 mounted on a CCD circuit substrate 59, a scanner circuit 60, a position determining roller 62, etc. are arranged in a casing 52.

The light source 54 is arranged at the bottom of the casing 52 at the lower left corner in FIG. 6. The color separation optical system 20, which was described with reference to FIG. 5, is disposed adjacent to the light source 54. A slit 64 is formed at the bottom of the casing 52 just below the color separation optical system 20. The illumination light of the light source 54 falls on a subject 66 through the slit 64, and the light which is reflected by the subject 66 enters to the casing 52 through the slit 64.

As previously described with reference to FIG. 5, as the color separation optical system 20, the four-wall reflection type color separation optical system is adopted, which is composed of four walls that consist of three layers which respectively reflect the light according to its wavelength of the three primary colors: blue, green and red.

The color separation optical system 20 is supported by a supporting member (not shown) so that the lower reflective walls 12, 18 can be at an angle of θ=45° to the bottom face of the casing 52.

The color separation optical system 20 is provided with an opening (the entrance opening 70 in FIG. 5) for taking the light which is reflected by the subject 66, in proximity to an intersection of the lower reflective walls 12, 18, and an opening (the exit opening 72 in FIG. 5) for outputting the color-separated rays in proximity to an intersection of the upper reflective walls 14, 16.

The light which is reflected by the subject 66 enters the casing 52 through the slit 64, and enters the color separation optical system 20 through the entrance opening 70. Then, the light is color-separated via the reflection route which was previously described with reference to FIG. 5, and the light is finally output from the color separation optical system 20 through the exit opening 72.

The lens 56 and the 3-line CCD 58 are arranged above the color separation optical system 20, and each of the color-separated rays is guided to a light accepting plane of each color channel of the 3-line CCD 58 through the lens 56.

The 3-line CCD 58 consists of CCDs of blue, green and red channels arranged in three straight rows on a chip. The ray of each color falls on the light accepting plane of each color channel of the 3-line CCD 58, and is transformed into electric signals in accordance with the intensity of the light. The electric signals are sent to the scanner circuit 60, and an image signal processing means of the scanner circuit 60 obtains the information about a color image on the subject 66.

The roller 62 is provided with a means such as an encoder (not shown) for counting the number of revolutions of the roller 62, thereby determining a position to which the scanner 50 moves and the amount of movement.

According to the color scanner optical system which is constructed in the above-mentioned manner, when the scanner 50 moves in one direction (to the right or left in the drawing) along the subject 66, the roller 62 rotates in contact with the subject 66. The scanner 50 smoothly moves with a distance between the scanner 50 and the subject 66 being fixed. The position of the scanner 50 is determined according to the number of revolutions of the roller 62. The light which is reflected by the subject 66 is sequentially guided to the 3-line CCD 58 via the above-mentioned color separation optical system and the lens 56 to thereby capture information about a two-dimensional image on the subject 66.

The above-described four-wall reflection type color separation optical system can vary the number of reflections by changing the ratio of lengths of two pairs of parallel reflective walls. Thus, the separation intervals between the rays of the three colors can be adjusted according to the positions of the light accepting plane of the color channels in the 3-line CCD.

If every reflective wall of the four-wall reflection optical system is the ordinary mirror, which reflects light of any color, and if a 1-line sensor is used as an image pickup means, the scanner optical system for a single color (black and white) can be built. For this reason, if each reflective wall of at least one pair of the two pairs of parallel reflective walls in the four-wall reflection optical system consists of the above-mentioned dichroic mirrors, and if the 3-line CCD is used as the image pickup means, the color scanner optical system can easily be constructed. Thus, the black and white scanner optical system can easily be converted to the color scanner optical system.

Figure 8:
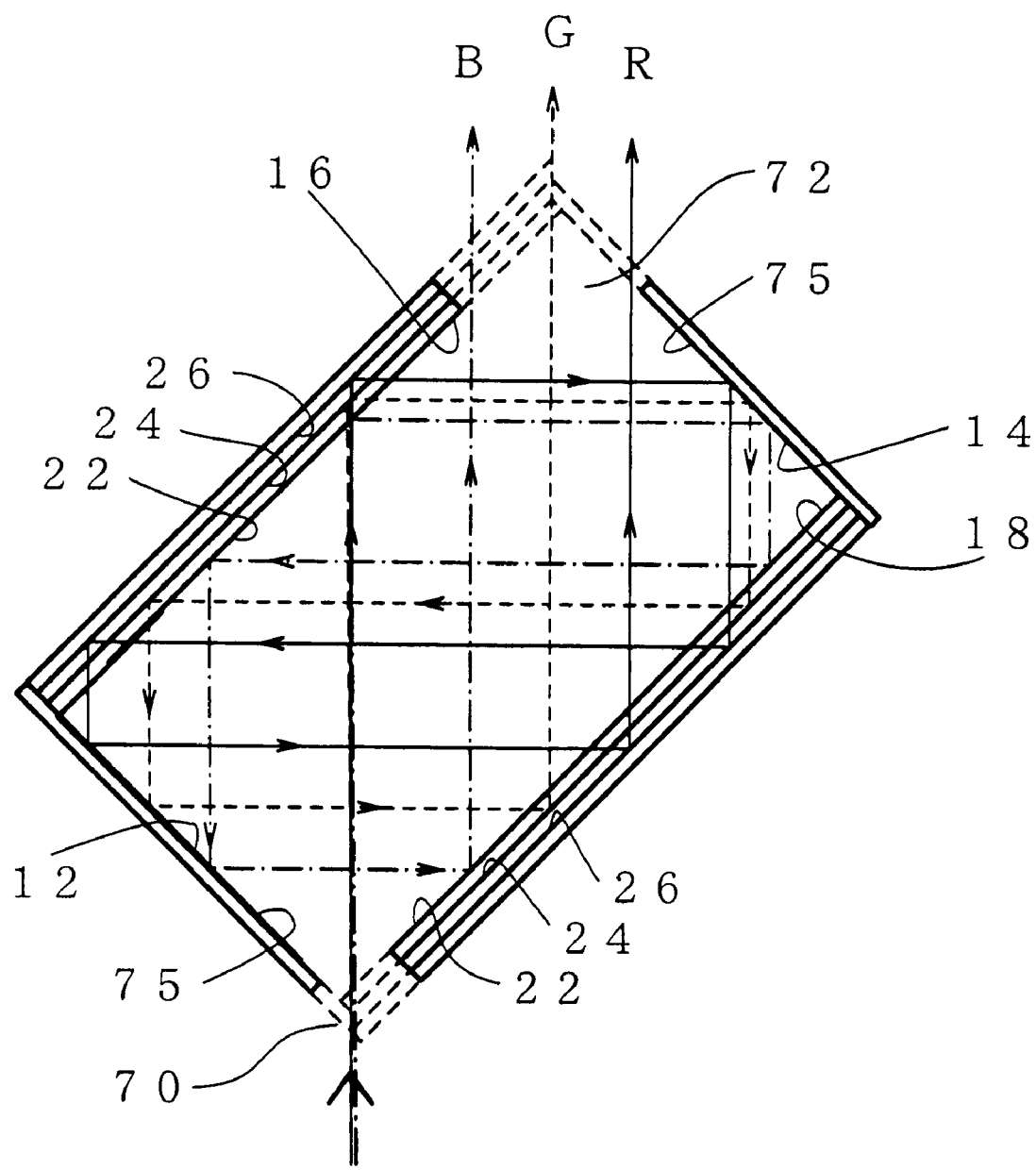
FIG. 8 is a view describing a reflection route in another embodiment in which each reflective wall of a pair of parallel reflective walls is an ordinary mirror.

In this embodiment, every reflective wall of the four-wall reflection optical system consists of three layers; however, as shown in FIG. 8, each reflective wall of a pair of parallel reflective walls may be the ordinary mirror reflecting light of any color.

In the color separation optical system in FIG. 8, the second and fourth reflective walls 14, 12 are the ordinary mirrors 75. In this embodiment, the separation intervals between the color rays can be longer than those in the color separation optical system shown in FIG. 5.

Figure 9:
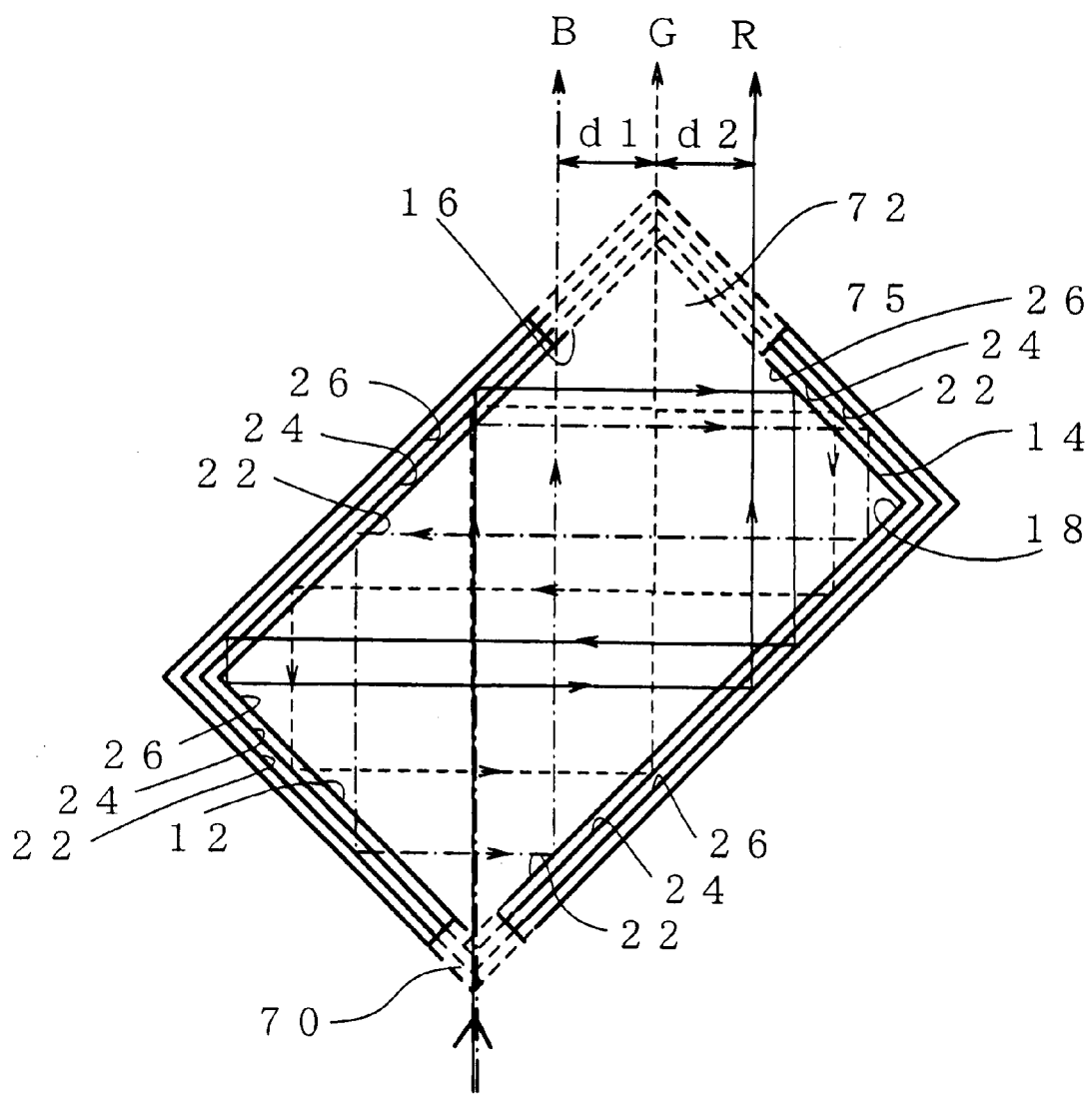
FIG. 9 is a view illustrating the construction of another embodiment for the color separation optical system of the present invention.

The dichroic mirrors of the reflective wall may be stacked in a different manner. For example, in a four-wall reflection optical system shown in FIG. 9, each reflective wall of a pair of parallel reflective walls (the first and third reflective walls 16, 18) consists of three layers of the first dichroic mirror 22, the second dichroic mirror 24, and the third dichroic mirror 26 which are stacked in order from the light incident face of the reflective wall. Each reflective wall of the other pair of parallel reflective walls (the second and fourth reflective walls 14, 12) consists of three layers of the third dichroic mirror 26 which reflects the third color light, the second dichroic mirror 24 which reflects the second color light, and the first dichroic mirror 22 (which may be the ordinary mirror) which reflects the first color light, which are stacked in order from the light incident face of the reflective wall. In this embodiment, the dichroic mirrors of each reflective wall of one pair of parallel reflective walls are stacked in reverse order to that of the dichroic mirrors of each reflective wall of the other pair of parallel reflective walls, and thus separation distances $d_1$, $d_2$ are longer than those of the four-wall reflection optical system in which every reflective wall consists of the dichroic mirrors stacked in the same order.

In these embodiments, the length of a pair of parallel reflective walls and the length of the other pair of parallel walls are in the ratio of 3:5; however, the ratio may be varied so as to change the reflection route and the number of reflections as stated above.

Figure 10:
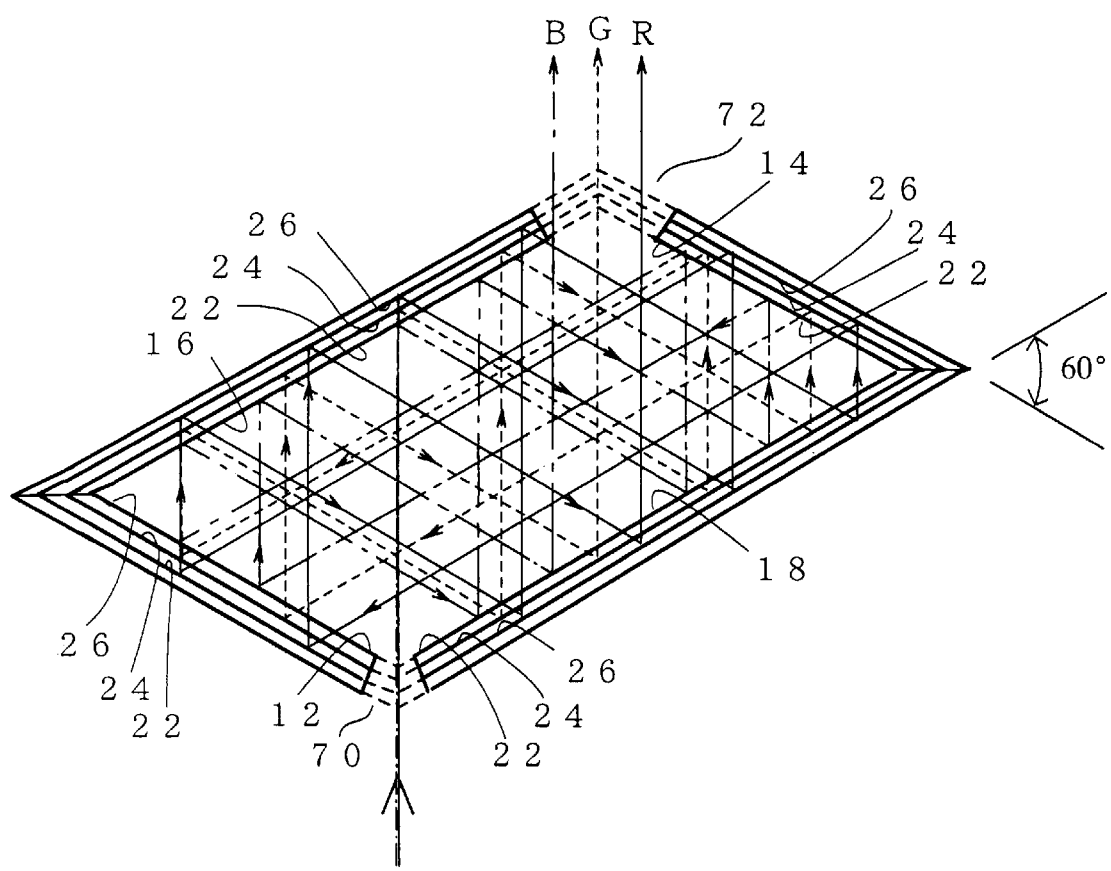
FIG. 10 is a view describing a reflection route in another embodiment in which two pairs of parallel reflective walls intersect at angles of 60° and 120°.

Moreover, in these embodiments, one pair of parallel reflective walls 12, 14 intersect the other pair of parallel reflective walls 16, 18 at a right angle, but they may intersect at angles of 60° and 120° as shown in FIG. 10.

Furthermore, in these embodiments, a vertical scanner is constructed, in which the entrance opening 70, the lens 56 and the 3-line CCD 58 are vertically arranged in substantially a straight line. The present invention, however, may also be applied to a horizontal scanner which uses a four-wall reflection optical system in which an incident light enters from below and exits in a perpendicular direction (horizontal direction).

The four-wall reflection optical system may be formed by assembling four separate reflective walls, or by coating four faces of a block of optical glass, optical plastic, etc.

As set forth hereinabove, according to the color separation optical system of the present invention, in the four-wall reflection optical system composed of two pairs of parallel reflective walls, each reflective wall of at least one pair of the two pairs of parallel reflective walls consists of three layers each of which reflects the light of a wavelength of one of the three primary colors. For this reason, by selecting the total number of reflections by changing the ratio of the lengths of the two pairs of parallel reflective walls, it is possible to form an optical path of desired length and to color-separates the light into three color rays at desired separation intervals.

In particular, if the reflective layers in each reflective wall of one pair of the parallel reflective walls are stacked in a manner contrary to the reflective layers in each reflective wall of the other pair of the parallel reflective walls, the color separation intervals can be longer than in the case where the reflective layers of every reflective walls are stacked in the same order, on condition that the number of reflections is the same.

The color scanner optical system can easily be constructed by using the above-described color separation optical system and the 3-line sensor.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A color separation optical system comprising:
   two pairs of parallel reflective walls, each reflective wall of at least one pair of said two pairs of parallel reflective walls consisting of a first dichroic mirror reflecting light of a first color among the three primary colors, a second dichroic mirror reflecting light of a second color among the three primary colors, and a mirror reflecting light of a third color among the three primary colors, said first and second dichroic mirrors and said mirror reflecting light of the third color being stacked in order from a light incident face of the reflective wall; and wherein light which enters an area enclosed by said two pairs of parallel reflective walls through an entrance opening is reflected at least once on every reflective wall of said two pairs of parallel reflective walls, the light is color-separated into three rays of the three primary colors, and the three rays are output through an exit opening.

2. The color separation optical system as defined in claim 1, wherein:

each reflective wall of a first pair of said two pairs of parallel reflective walls consists of the first and second dichroic mirrors and the mirror reflecting light of the third color which are stacked in order from the light incident face of the reflective wall; and each reflective wall of a second pair of said two pairs of parallel reflective walls consists of a third dichroic mirror reflecting light of the third color, the second dichroic mirror, and a mirror reflecting light of the first color which are stacked in order from the light incident face of the reflective wall.

3. A color scanner optical system for color-separating light, reflected by a subject illuminated by a light source, into three rays of the three primary colors, and for guiding each of the three rays to a light accepting plane in each color channel of a 3-line sensor via a lens, said color scanner optical system comprising:

two pairs of parallel reflective walls, each reflective wall of at least one pair of said two pairs of parallel reflective walls consisting of a first dichroic mirror reflecting light of a first color among the three primary colors, a second dichroic mirror reflecting light of a second color among the three primary colors, and a mirror reflecting light of a third color among the three primary colors, said first and second dichroic mirrors and said mirror reflecting light of the third color being stacked in order from a light incident face of the reflective wall; and wherein the light reflected by the subject which enters an area enclosed by said two pairs of parallel reflective walls is reflected at least once on every reflective wall of said two pairs of parallel reflective walls, the light is color-separated into three rays of the three primary colors, the rays being parallel with one another, and the three rays are guided to said lens.

* * * * *